Improved Neck Yoke fastening.
PATENTED NOV 26 1867
71312
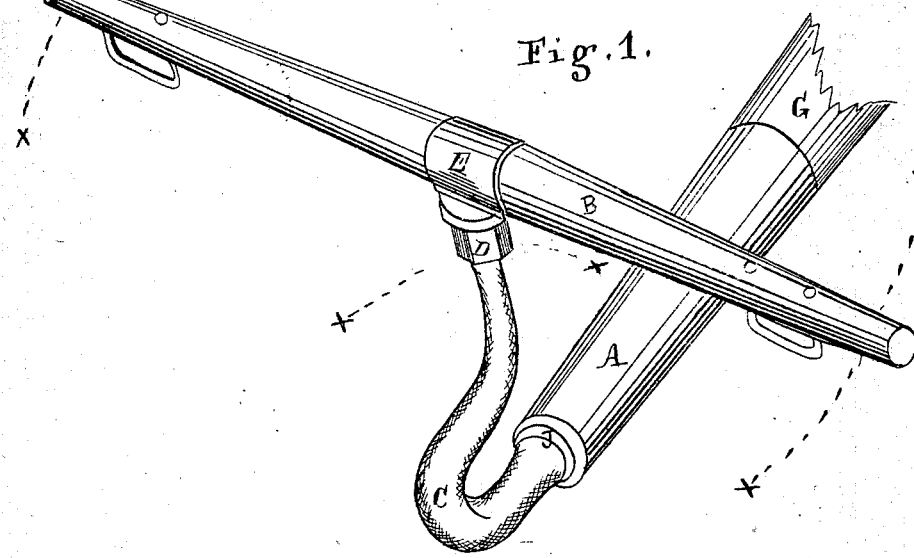
Fig. 1.
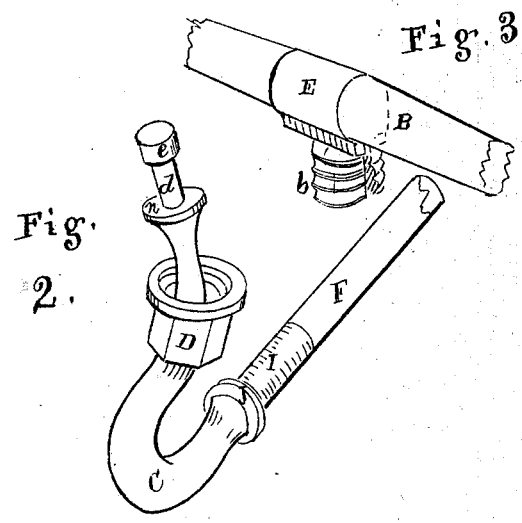
Fig. 2.
Fig. 3.
Witnesses
G. W. Stiglman
Daniel F. Estell
Inventor
Henry J. Laurin
By Joseph Ridge
his Attorney

United States Patent Office.

HENRY J. LAMM, OF RICHMOND, INDIANA.

Letters Patent No. 71,312, dated November 26, 1867.

IMPROVEMENT IN NECK-YOKE FASTENING.

*The Schedule referred to in these Letters Patent and making part of the same.*

TO ALL WHOM IT MAY CONCERN:

Be it known that I, HENRY J. LAMM, of the city of Richmond, and State of Indiana, have invented a new and useful Improvement in Fastenings for Neck-Yokes of Carriages, &c.; and I do hereby declare that the following is a full, clear, and exact description of the same, reference being had to the accompanying drawings, making a part of this specification, in which—

Figure 1 is a view of the neck-yoke as connected with the tongue or pole of the carriage.

Figure 2 represents the connecting-shank, and

Figure 3 a section of the yoke.

The same letters in the different figures relate to corresponding parts of the invention.

The nature of my invention consists in an attachment or fastening for the neck-yokes of carriages, &c.; by the use of a metallic connecting-shank, in such a manner as to give the necessary lateral and horizontal motion obtained by the leather, as in ordinary use. Great advantages in economy and durability are thus gained.

To enable others skilled in the art to make and use my invention, I will proceed to describe it with reference to the drawings.

A represents a socket on the end of the tongue or pole G of the carriage. B represents the neck-yoke, and C the connecting-shank. The socket A is solid to a distance from its terminating end about equal to the length of the end F of the shank, excepting the orifice of proper size to closely admit the said end F, the remaining portion of the socket being made suitable as a thimble for the end of the tongue. J represents a shoulder on the shank, regulating the depth to which the end F is inserted. I represents a rubber collar or band on the inserted end of the shank, for the purpose of obviating any rattling of the said devices. $b$ is a hollow screw, formed of the ends of the band E, brought together, and thus making said screw of disconnected halves. A suitable recess is formed within the screw $b$, and near the yoke, into which the head $e$ is admitted as the end of the shank is inserted by forcing apart the halves composing the screw. The nut D is then screwed up, as shown in fig. 1, thus securing the parts and forming a swivel connection admitting of a horizontal turning of the yoke. The manner of connecting the end F, by inserting the same in the socket A, admits of the necessary lateral motion of the devices.

Having thus fully described my said invention, what I claim, and desire to secure by Letters Patent, is—

1. I claim the combination of the socket A, shank C, and neck-yoke B, when arranged to admit of the swivel action at each end of the shank, substantially as described and for the purpose specified.

2. I claim the open screw $b$, the end $d$, having a head, $e$, and the nut D, for obtaining a swivel-joint, when used in combination with the yoke B and shank C, substantially as set forth, and for the purpose described.

3. I claim, in combination with the socket A and shank C, the rubber band I, substantially as set forth, and for the purpose described.

HENRY J. LAMM.

Witnesses:
JOSEPH RIDGE,
SAML. F. ESTELL.